United States Patent [19]
Nishikawa et al.

[11] Patent Number: 5,724,198
[45] Date of Patent: Mar. 3, 1998

[54] RETRACTABLE REAR UNDER VIEW MIRROR DEVICE FOR AN AUTOMOTIVE VEHICLE

[75] Inventors: Masumi Nishikawa, Toyoake; Shoji Okada, Anjyo; Hidekazu Kogita, Kariya, all of Japan

[73] Assignee: Aisin Seiki Kabushiki Kaisha, Kariya, Japan

[21] Appl. No.: 709,839

[22] Filed: Sep. 10, 1996

[30] Foreign Application Priority Data

Sep. 12, 1995 [JP] Japan ................................. 7-234397
Sep. 13, 1995 [JP] Japan ................................. 7-235262

[51] Int. Cl.⁶ .......................... G02B 7/182; B60R 1/06
[52] U.S. Cl. ...................... 359/841; 359/872; 359/877
[58] Field of Search ............................ 359/841, 843, 359/844, 872, 877

[56] References Cited

U.S. PATENT DOCUMENTS

| | | | |
|---|---|---|---|
| 3,468,218 | 9/1969 | Schimmelpfennig | 359/841 |
| 4,469,405 | 9/1984 | Chin-Wun | 359/841 |
| 4,911,545 | 3/1990 | Miller | 359/841 |
| 4,936,669 | 6/1990 | Wun | 359/841 |
| 5,337,190 | 8/1994 | Kogita et al. | 359/877 |
| 5,497,273 | 3/1996 | Kogita et al. | 359/843 |
| 5,537,263 | 7/1996 | Kogita et al. | 359/841 |

FOREIGN PATENT DOCUMENTS

| | | | |
|---|---|---|---|
| 2681821 | 4/1993 | France | 359/841 |
| 0808530 | 1/1952 | Germany | 359/841 |
| 3718125 | 8/1988 | Germany | 359/877 |
| 0194640 | 11/1983 | Japan | 359/841 |
| 0179350 | 9/1985 | Japan | 359/841 |
| 0150849 | 7/1986 | Japan | 359/841 |
| 63-124539 | 8/1988 | Japan . | |
| 1-127430 | 5/1989 | Japan . | |
| 2-24345 | 7/1990 | Japan . | |
| 6-87379 | 3/1994 | Japan . | |
| 6-92185 | 4/1994 | Japan . | |

*Primary Examiner*—Ricky D. Shafer
*Attorney, Agent, or Firm*—Burns, Doane, Swecker & Mathis, LLP

[57] ABSTRACT

The present invention provides a rear under view mirror device having a driving arm and a follower link which are compact in structure. The first driving arm is coupled to a power source and rotatably supported on a mirror assembly and the follower link is coupled to a deflector and the mirror housing. The first driving arm is lockated in parallel with the follower link.

9 Claims, 8 Drawing Sheets

RETRACTABLE REAR UNDER VIEW MIRROR DEVICE FOR AN AUTOMOTIVE VEHICLE

BACKGROUND OF THE INVENTION

The present invention relates to a retractable rear under view mirror device provided on a rear upper portion of an automotive vehicle so as to allow a driver to observe an under area to the rear of the vehicle.

To deflect air flow to a rear window pane of an automotive vehicle and reduce a lift created at a rear portion of the vehicle by changing the original aerodynamic characteristic possessed by an external shape of the vehicle such as a station wagon or van-type vehicle, there is provided a deflector or a rear spoiler.

In the meantime, to ensure a rear under field of view from a driver's seat of the vehicle such as the station wagon or van-type vehicle when the vehicle is running backward, there is provided a rear under view mirror assembly mounted on the rear portion of the vehicle.

A technical aspect to house the rear under view mirror assembly in a space or recess formed on the deflector when it takes a stored position and to outwardly protrude the rear under view mirror assembly from the deflector when it takes a use position to ensure the rear under field of view from the driver's seat is well known, for example, by Japanese Patent Laid-Open (KOKAI) Publication Nos. 87379/1994 and 92185/1994. In these examples of the prior art, the deflector is provided at opposed side surfaces of the recess with guide rails into which rollers are slidably fitted and follower links having the rollers are secured to side surfaces of a mirror housing for the rear under view mirror assembly. Driving links are rotatably secured at one ends to the side surfaces of the mirror housing of the mirror assembly and fixed at the other ends to a rotatable rod or shaft coupled to an electric motor. The actuation of the motor causes the driving links and the mirror housing to be swung about the rotatable rod and the follower links having the rollers to be moved along the guide rails, so that the rear under view mirror assembly will take the stored position or the use position. The use position of the rear under view mirror assembly is detected and maintained by abutments of the rollers and stoppers secured on the guide rails and also the driving links and the follower links.

As mentioned above, in the prior art since the maintenance of the use position of the rear under view mirror assembly is performed by the abutments of the rollers and the stoppers and also the driving links and the follower links, each components must be finished in a high grade fashion and assembled carefully to provide relative positionings thereof with high accuracy. Thus, it is disadvantageous in reducing the man-hour and manufacturing cost.

SUMMARY OF THE INVENTION

Accordingly, it is an object of the present invention to provide a retractable rear under view mirror device for an automotive vehicle which is capable of solving the aforementioned drawbacks encountered in a prior art.

It is another object of the present invention to provide a retractable rear under view mirror device for a vehicle which is capable of providing a driver with a wide visual field and ensuring a smooth and safe operation of the vehicle when the vehicle is running backward.

In accordance with the present invention, the foregoing object is attained by providing a retractable rear under view mirror device mounted rearward of an automotive vehicle, comprising: a deflector provided rearward of the automotive vehicle and having a recess; a mirror assembly including a mirror housing and a rear under view mirror and movably supported with respect to the deflector to selectively be positionable from a stored position inside the recess of the deflector to a use position wherein the rear under view mirror reflects the rear under field of view of the automotive vehicle and allows a driver to observe therethrough the rear under field of view thereof and vice versa; and driving means for moving the mirror assembly to be positioned in the stored position or the use position, the driving means having a rotatable rod connected to an output shaft of an electric motor and rotatably supported on the deflector, a first arm fixed at one end to the rotatable rod and pivoted at the other end to one of side surfaces of the mirror assembly, and a follower arm rotatably supported at one end on one of side surfaces of the recess of the deflector and pivoted at the other end to one of side surfaces of the mirror assembly.

There is further provided a retractable rear under view mirror device for a vehicle adapted to allow a driver to observe therethrough a rear under view of the vehicle, comprising: a mirror assembly capable of transferring an image of the rear under view of the vehicle to the driver; a stationary member mounted to a rear portion of the vehicle and having a space for accommodating the mirror assembly therein; and actuating means for driving the mirror assembly from a stored position wherein it is housed in the space of the stationary member to a use position wherein it enables the driver to ensure the rear under area to the vehicle or from the use position to the stored position, the actuating means including a power source mounted on the stationary member, a first swingable arm extending between a side surface of the mirror assembly and a side surface for defining the space of the stationary member and coupled to the power source at one end and the mirror assembly at the other end, and a link rotatably supported to the stationary member and pivoted to the mirror assembly.

According to the present invention, there is furthermore provided a retractable rear under view mirror device for a vehicle mounted rearward of an automotive vehicle, comprising: a deflector mounted on a rear portion of the vehicle; a mirror assembly movably supported by the deflector and selectively taking a stored position housed in a recess formed on the deflector and a use position protruding from the deflector; a first arm disposed between one of side surfaces of the mirror assembly and one of side surfaces for defining the recess and moving the mirror assembly to the stored position and the use position; a second arm disposed between the other side surface of the mirror assembly and the other side surface of the recess and moving the mirror assembly to the stored position and the use position; driving means connected to a power source and swinging the first arm and the second arm to follow a constant locus therefor; a first stopper for restraining a movement of the mirror assembly by co-operating with the first arm and keeping the use position thereof; and a second stopper for holding the mirror assembly by co-operating with the second arm.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Embodiments of the present invention will now be described in detail with reference to the accompanying drawings.

Figure 1:
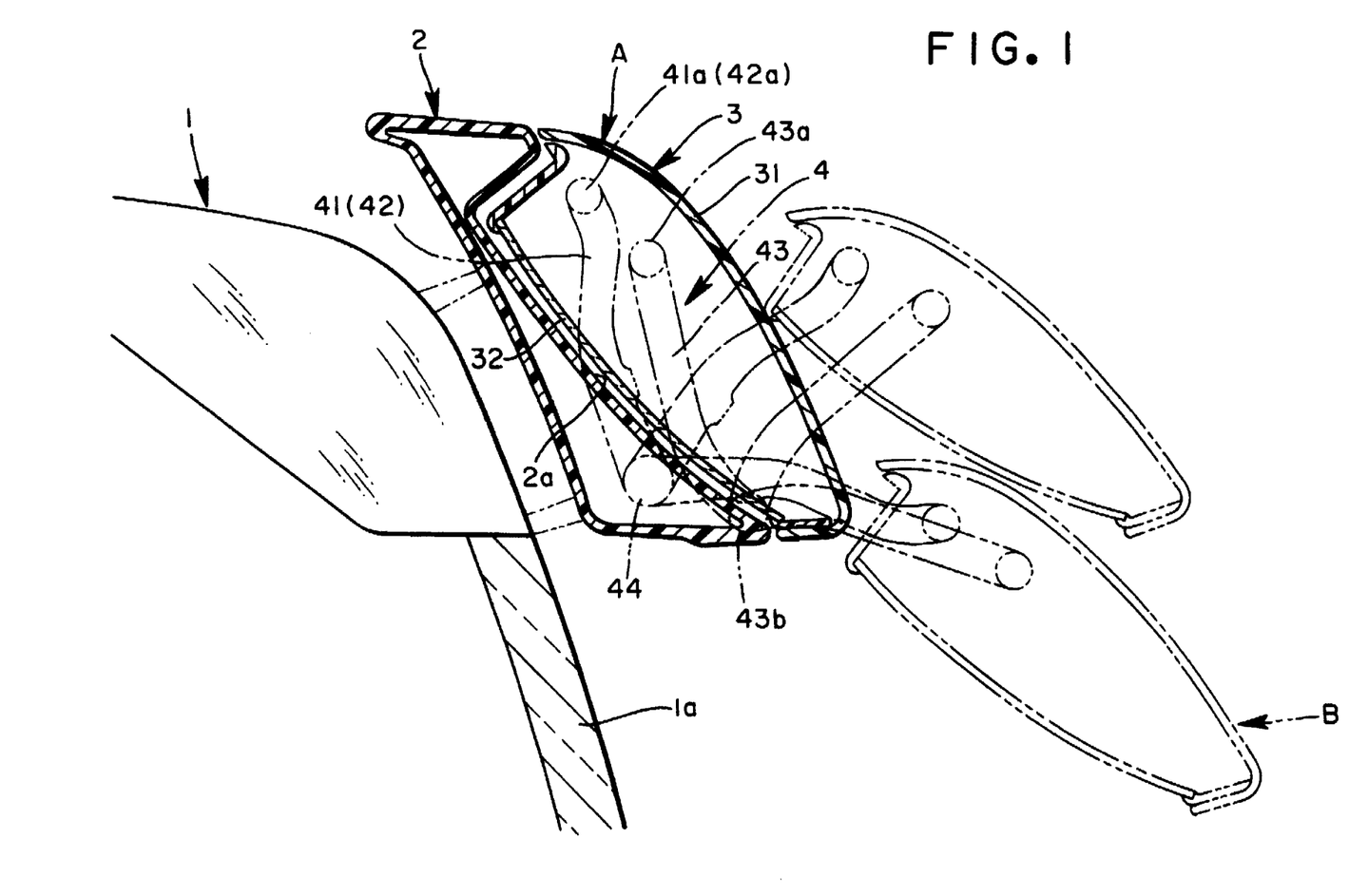
FIG. 1 is a side view of a retractable rear under view mirror device of a first embodiment of the present invention.

As shown in FIG. 1, a deflector 2 having a space or recess 2a opening rearwardly is fixed to an upper portion of a rear window pane 1a disposed rearward of a vehicle 1 so as to deflect air flow toward the rear window pane 1a or reduce air resistance of air flow along the vehicle's roof as produced when the vehicle is running.

The deflector 2 is provided with a retractable rear under view mirror assembly 3. A retractable rear under view mirror device for an automotive vehicle according to one aspect of the present invention is composed of the deflector 2 and the mirror assembly 3 which can be stored in the recess 2a of the deflector 2 and extended out of the deflector 2. Namely, the retractable mirror assembly 3 is selectively positionable from a stored position where it is retracted into the recess 2a formed on the deflector 2 to a use position where it is extended out of the deflector 2 in response to a mirror housing driving means 4 described later and vice versa. The movable mirror assembly 3 includes a housing 31 which forms a part of the outer periphery of the deflector 2 in the stored position and a mirror 32 which is secured to the housing 31 and reflects the rear under view of the vehicle 1 in the use position.

Figure 2:
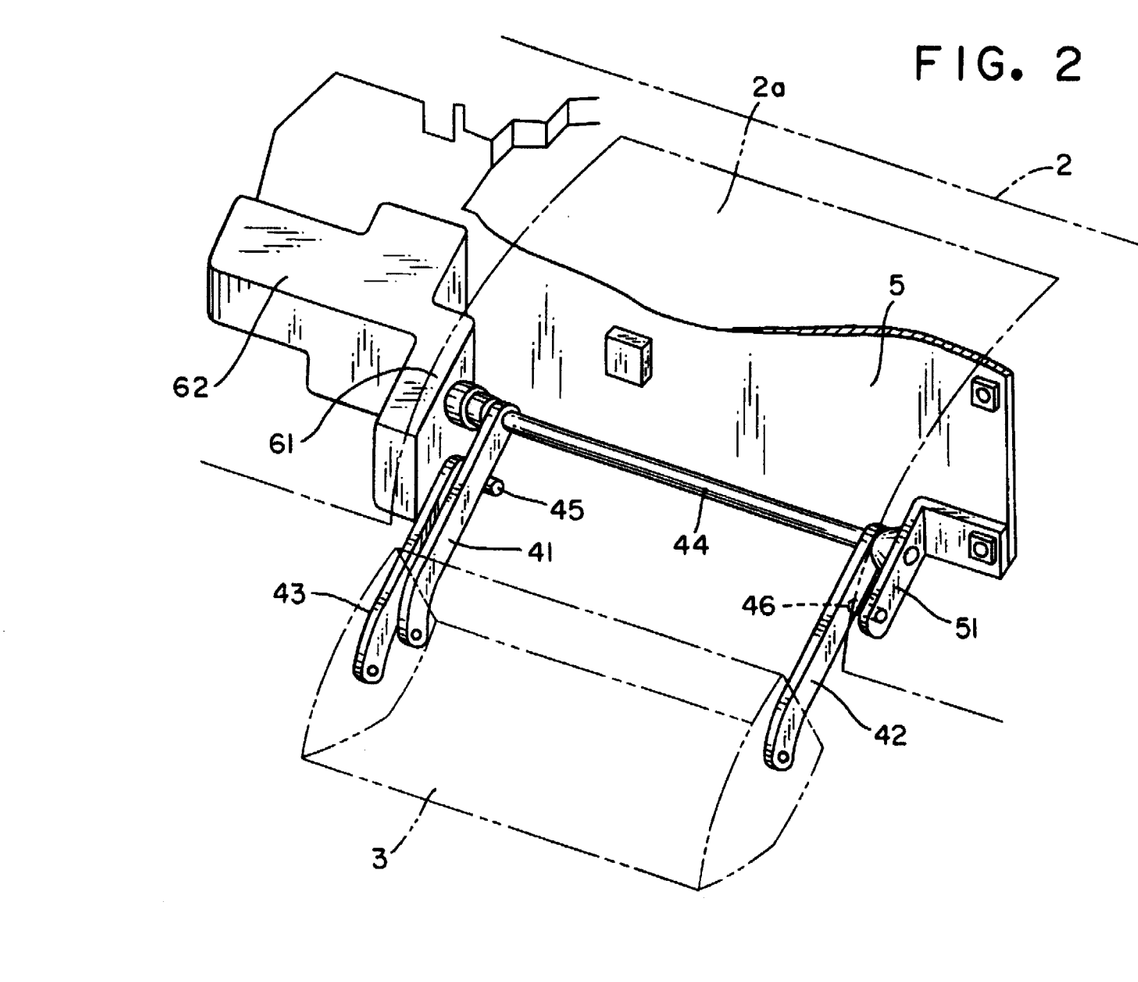
FIG. 2 is a rear view of the retractable rear under view mirror device illustrated in FIG. 1.
Figure 3:
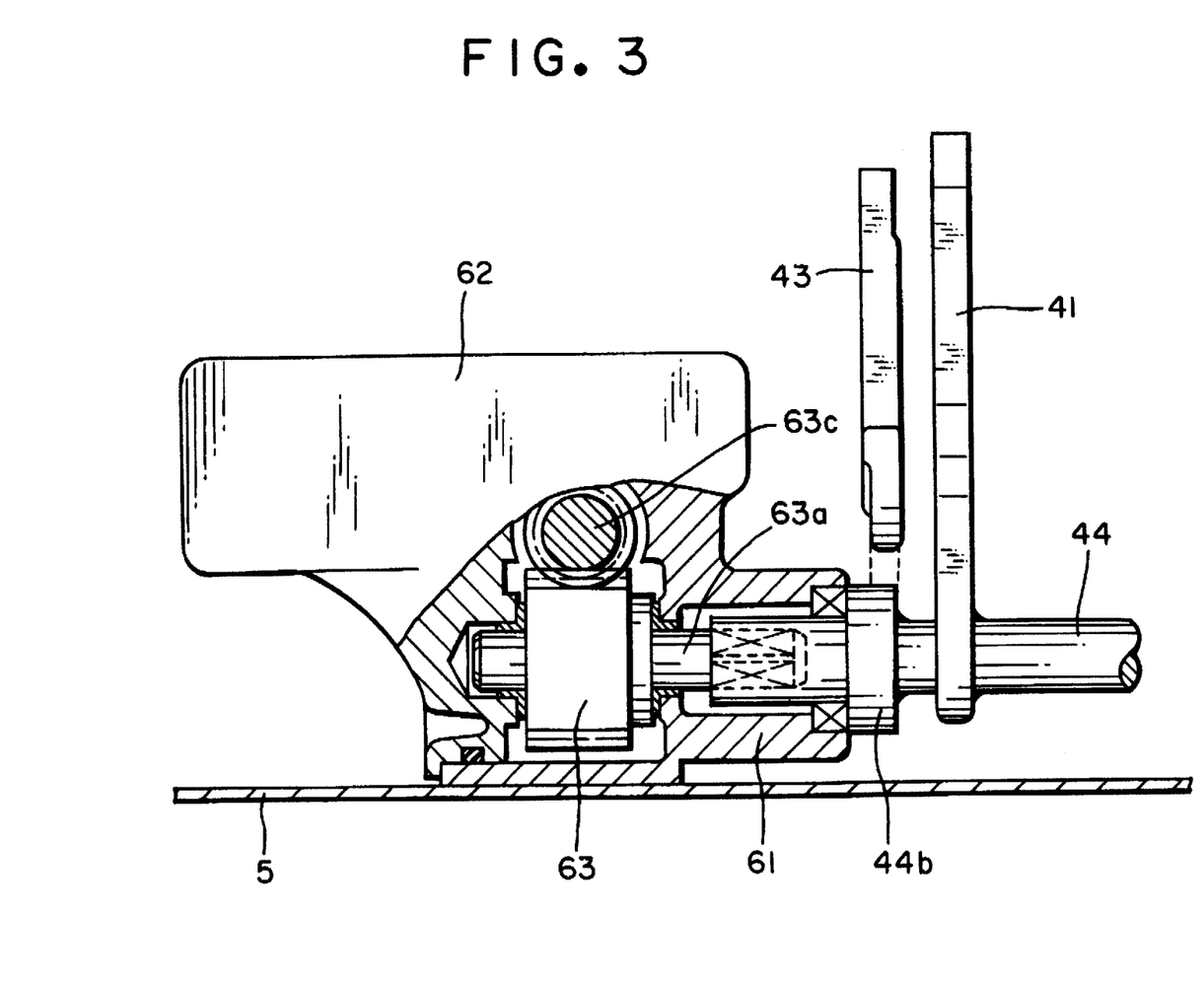
FIG. 3 is a partially broken view showing a power source, a first arm and a connecting rod.
Figure 4:
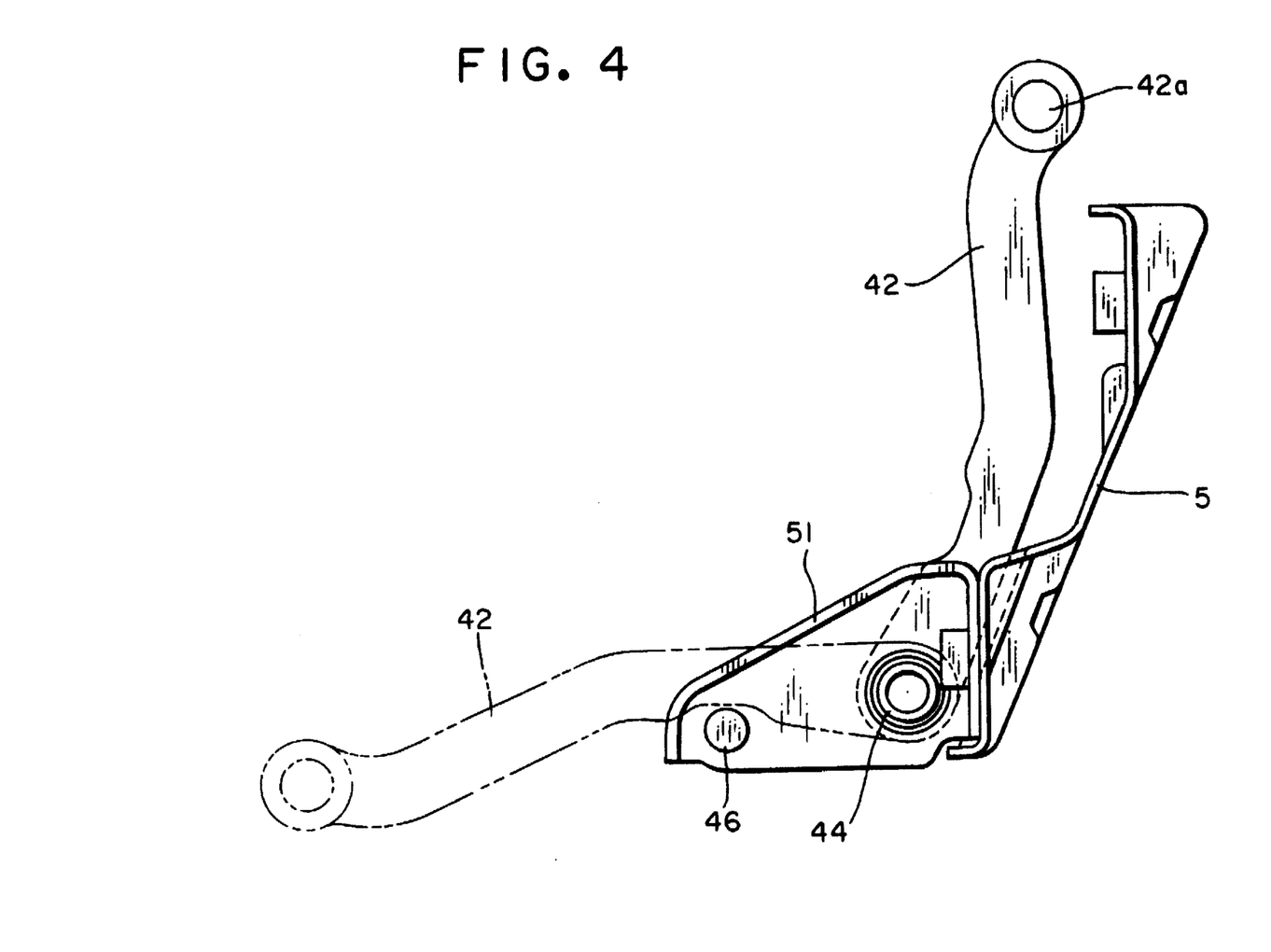
FIG. 4 is a side view showing a second arm and the connecting rod.

As shown in FIGS. 2–6, the driving means 4 includes a first arm 41 and a second arm 42 which are fixed to a rotatable tube or rod 44 and disposed between opposite side surfaces of the movable mirror housing 31 and opposite side surfaces of the recess 2a of the deflector 2. The rotatable rod 44 is located within the deflector 2 longitudinally along the movable mirror housing 31. The driving means 4 further includes a follower link 43 which is rotatably connected at one end to the side surface of the mirror housing 31 by means of a pin 43a and located in parallel with the first arm 41. The deflector 2 has a base plate or bracket 5 which extends longitudinally alongside of the recess 2a and serves in rotatably supporting one end of the rod 44 through a flange 51 of the bracket 5 (see FIGS. 2 and 4). An actuator means has an electric motor 62, an output shaft 63c, a reduction gear box 63 and a case 61 into which the motor 62 and the gear box 63 are accommodated as one unit and which is secured to the bracket 5 within the deflector 2. As shown in FIG. 2, the rotatable rod 44 is coupled to an output shaft 63a of the reduction gear box 63 by a collar 44b. The other end of the follower link 43 is rotatably secured to the case 61 through a pin 43b projecting therefrom (see FIG. 6). The other end of the first arm 41 is rotatably secured to the side surface of the mirror housing 31 by means of a pin 41a and the other end of the second arm 42 is rotatably secured to the opposed side surface of the mirror housing 31 by means of a pin 42a. Note that these arms 41, 42 and the link 43 are concealed by the mirror assembly 3 when it is retracted into the recess 2a of the deflector 2. Further, note that since one end of the rotatable rod 44 and also one end of the link 43 are rotatably supported by the case 61, bearing members therefor can be provided on the same plane of the case 61 so that a longitudinal length of the mirror assembly 3 may be prolonged to enable a wide rear under field of view.

Figure 5:
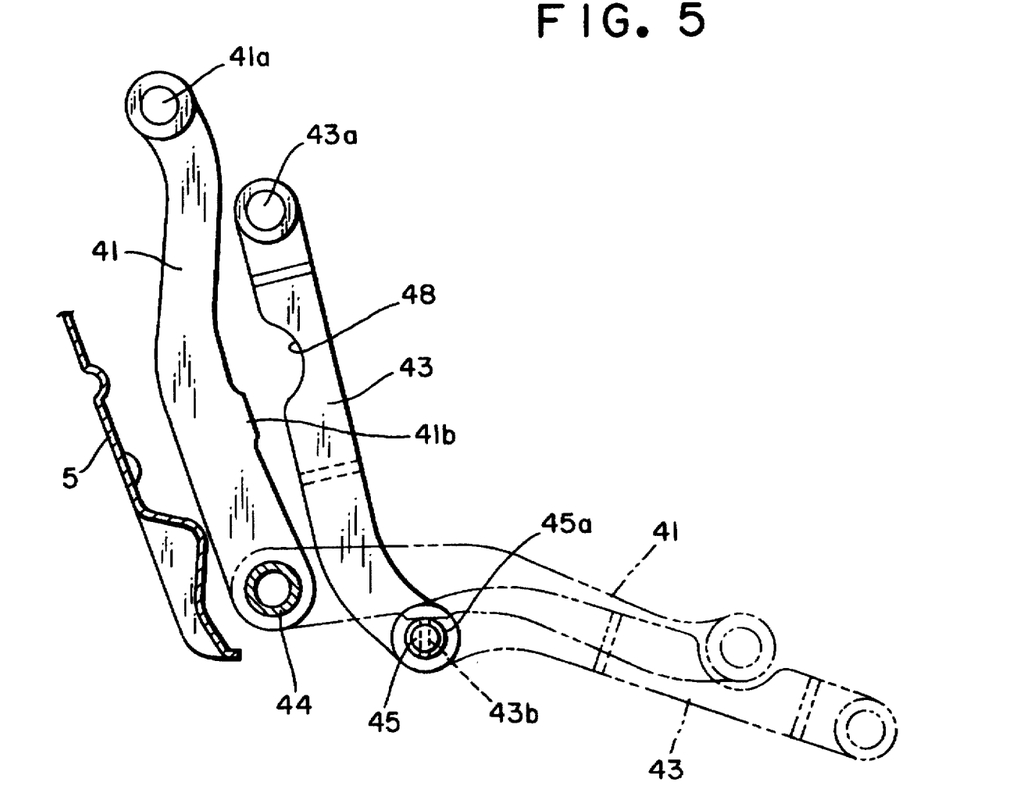
FIG. 5 is a side view showing a relation of the first arm and a follower or supplementary arm.
Figure 6:
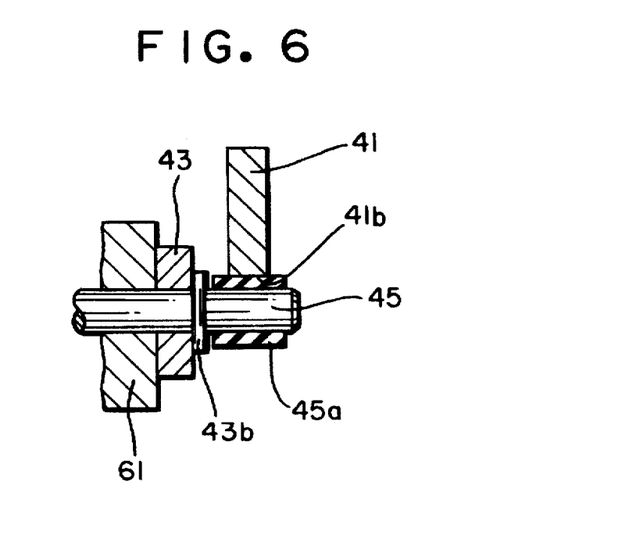
FIG. 6 is a view showing a first stopper.

As shown in FIGS. 5 and 6, the pin 43b which supports the link 43 is formed integral with a first stopper 45 longitudinally extending to the extent that the first stopper 45 is abutted on a raised portion 41b formed on the first arm 41 when the mirror assembly 3 takes the use position. The abutment of the first stopper 45 and the first arm 41 causes the mirror assembly 3 to be stopped and maintained at the use position. The stopper 45 has a rubber ring 45a to absorb the shock or noise which may be generated by the aforementioned abutment.

Figure 7:
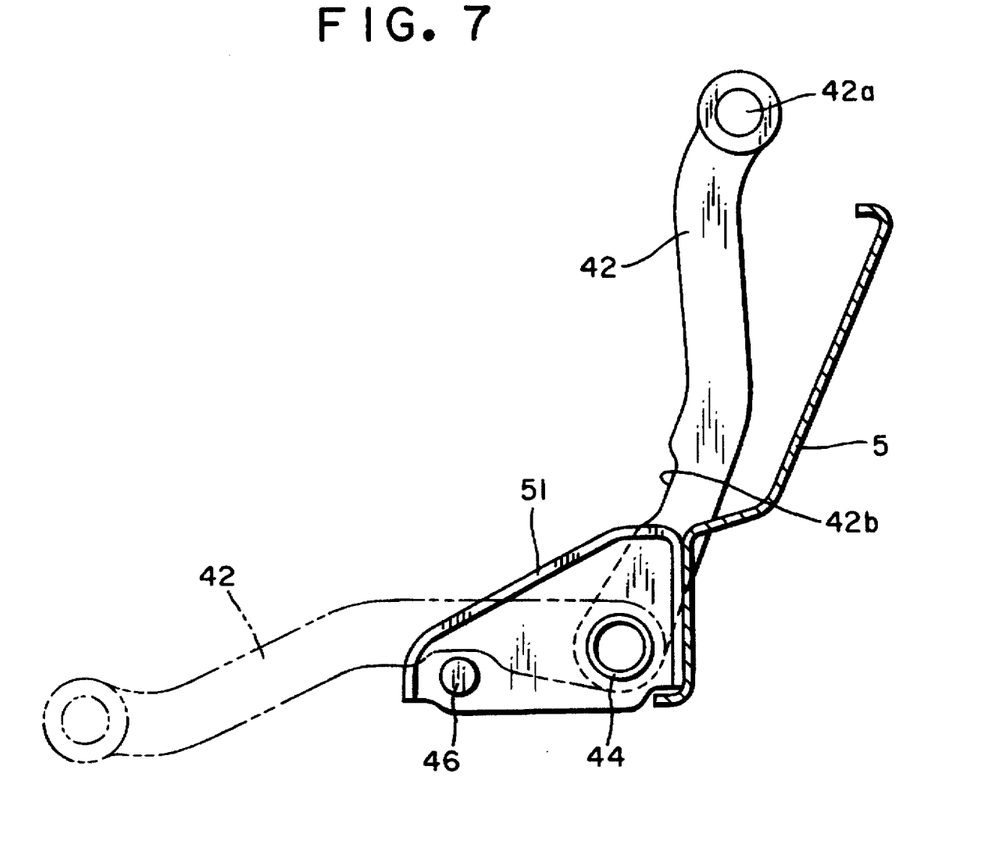
FIG. 7 is a side view showing an operation of the second arm.
Figure 8:
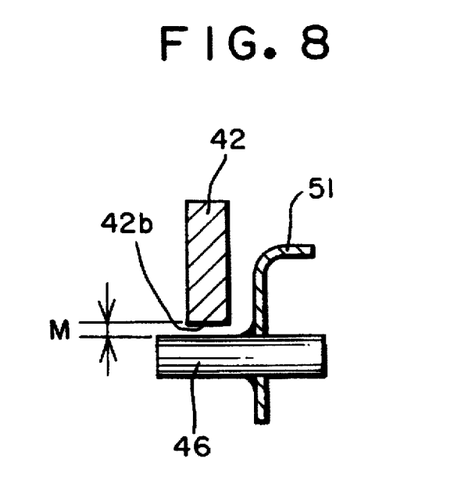
FIG. 8 is a view showing a relation of a second stopper and the second arm when the first arm is abutted on the first stopper.

As shown in FIGS. 7 and 8, the flange 51 is provided with a second stopper 46 longitudinally extending to the extent that the second stopper 46 is in abutment with a concave portion 42b when the mirror assembly 3 takes the use position. However, it is noted that when the downward movement of the mirror assembly 3 toward the use position is stopped by said abutment, a predetermined clearance or gap M remains between the second arm 42 and the second stopper 46, which depends on the configuration of the concave portion 42b.

Figure 9:
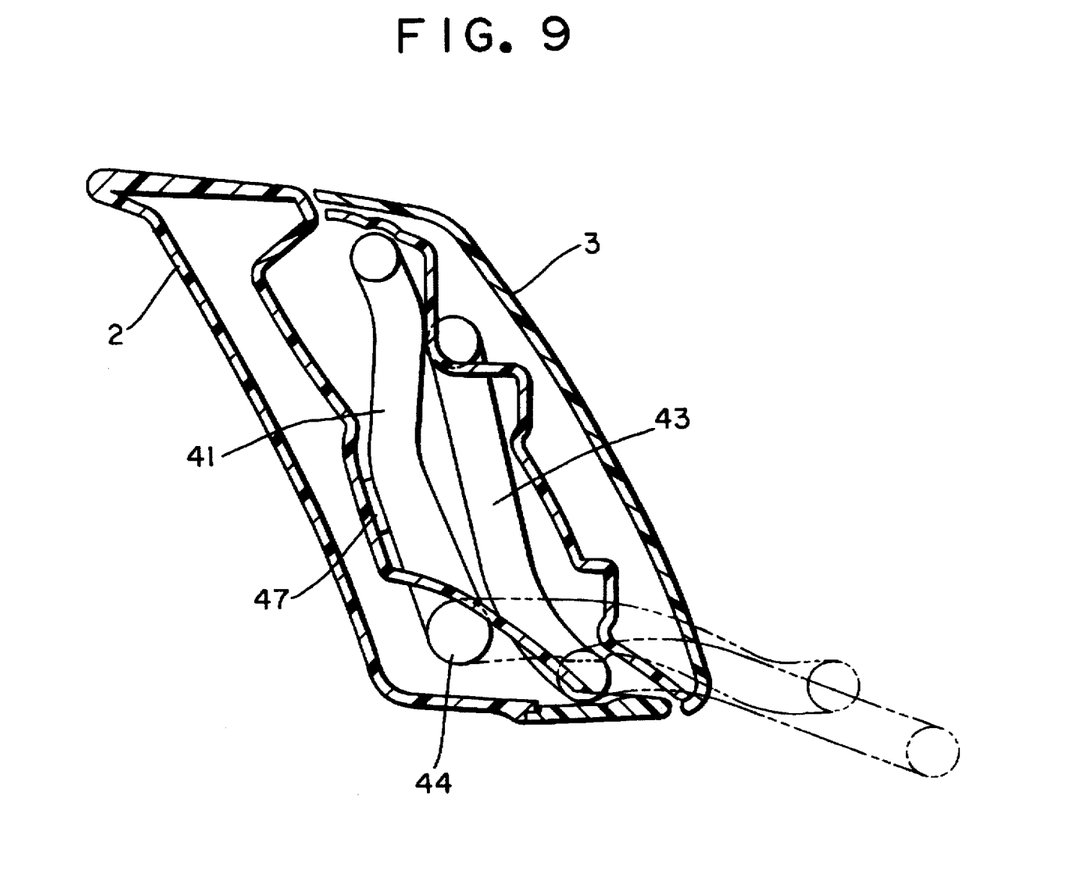
FIG. 9 is a side view of a second embodiment of the present invention when a stopper for restraining a movement of the first arm is attached to a deflector.

As shown in FIG. 9, the front surface of the deflector 2 is fitted with a third stopper 47 of a rubber material which is abutted on the first arm 41 when the mirror assembly 3 takes the stored position. The upward movement of the mirror assembly 3 toward the stored position is stopped by said abutment so that the outer surface of the deflector 2 is flush with the outer surface of the mirror assembly 3.

Figure 10:
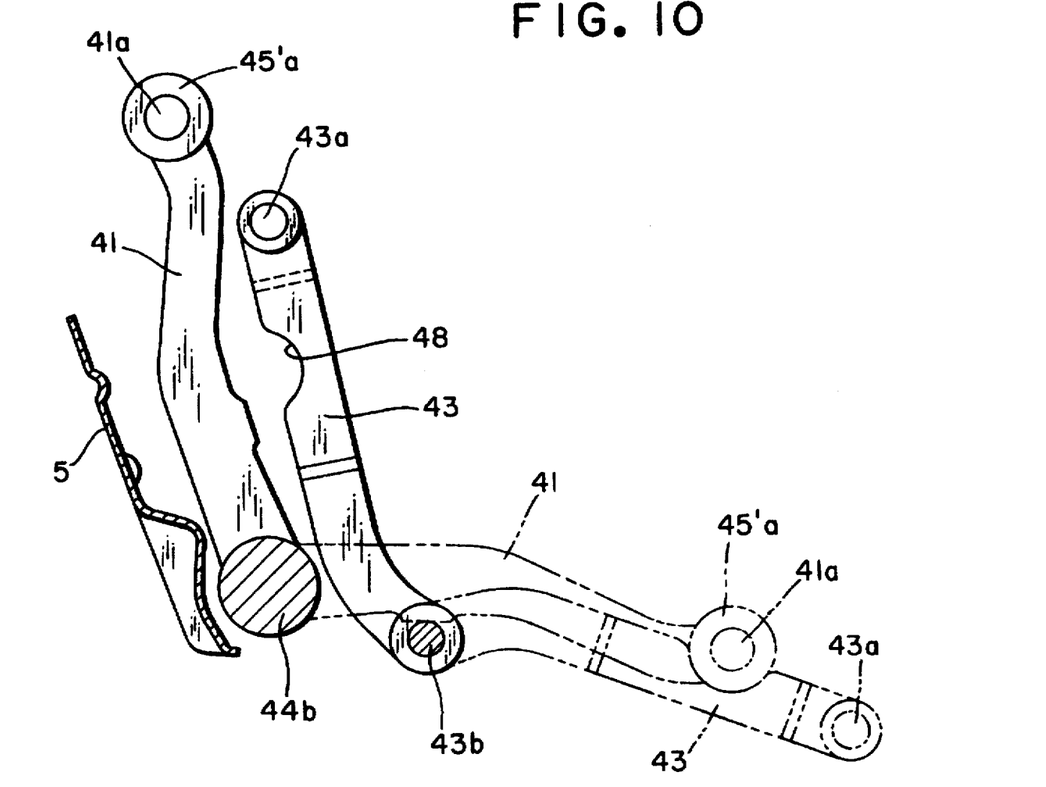
FIG. 10 is a view of a third embodiment of the present invention wherein a stopper is formed on the follower arm.
Figure 11:
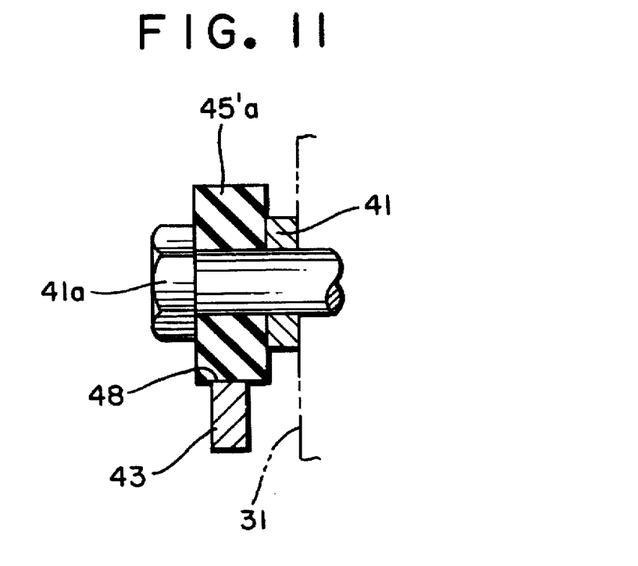
FIG. 11 is a sectional view showing a rubber ring as used in the third embodiment of the present invention.

As shown in FIGS. 10 and 11, the pin 41a for rotatably supporting the first arm 41 on the mirror housing 31 may be fitted with a rubber ring 45'a and the link 43 may be formed with a cut-out groove 48 in the shape of U-configuration according to another embodiment of the present invention. In this case, the downward movement of the first arm 41 is stopped by abutment of the rubber ring 45a' against the groove 48 formed on the link 43.

In the stored position A where the mirror assembly 3 is retracted in the recess 2a of the deflector 2 as shown in FIG. 1, when the motor 62 is actuated in the normal direction, the first arm 41 and the second arm 42 are rotated clockwise in FIG. 1 through the rotatable rod 44 so that the mirror assembly 3 is rotated clockwise in FIG. 1, but somewhat obliquely sliding downward in FIG. 1 together with the follower link 43 which is helpful in determining a short locus adjacent to the deflector 2 for the movement of the mirror assembly 3. The restriction of the clockwise rotation of the first arm 41 is made by the abutment of the first arm 41 against the first stopper 45 and the movement of the mirror assembly 3 is stopped thereby. Thus, the mirror assembly 3 will be extended out of the deflector along the short locus adjacent to the deflector 2 and take the use position B in FIG. 1 where it is useful for the driver to observe the rear under field of the vehicle 1 when the vehicle 1 is running backward. In this state, there is the small gap as between the second stopper 46 and the second arm 42 as shown in FIG. 8.

In the use position B where the mirror assembly 3 is extended out of the deflector 2, when the motor 62 is rotated in the reverse direction, the first arm 41 and second arm 42 are rotated counter-clockwise in FIG. 1 along the short locus adjacent to the deflector 2 through the rotatable rod 44. Upon abutment of the first arm 41 against the third stopper 47, the counter-clockwise rotation of the first arm 41 is restricted and the movement of the mirror assembly 3 is stopped. Thus, the mirror assembly 3 is restricted within the recess 2a of the deflector 2 and held at the stored position A as shown in FIG. 1.

In the use position B in FIG. 1, when external force is applied to the mirror housing 3 to rotate clockwise the first arm 41 and the second arm 42 in FIG. 1, the first arm 41 and the first stopper 45 cause the elastic member 45a to be deformed and the second arm 42 is abutted on the second stopper 46 so that the mirror housing 3 is held stably by the longitudinally spaced two points. Consequently, considerable part of the external force applied to the mirror assembly 3 is transmitted to the bracket 5 through the arms 41, 42 and the stoppers 45, 46 and a small amount of the external force applied to the mirror assembly 3 is transmitted to the actuator means through the rotatable rod 44. This is especially useful in reducing the thickness of the first arm 41 and the second arm 42 so that the rear under view mirror device according to the present invention is compact in construction, inexpensive to manufacture and easy to assembly. Further, it is expected that the damages of the mirror assembly 3 and the actuator means due to the external force is prevented.

As many apparently widely different embodiments of the present invention can be made without departing from the spirit and scope thereof, it is to be understood that the invention is not limited to the specific embodiments thereof except as defined in the appended claims.

What is claimed is:

1. A retractable rear under view mirror device mounted rearward of an automotive vehicle, comprising:
   a deflector provided rearward of the automotive vehicle and having a recess;
   a mirror assembly including a mirror housing and a rear under view mirror, the mirror assembly having side surfaces and being movably supported with respect to the deflector to selectively be positionable from a stored position inside the recess of the deflector to a use position wherein the rear under view mirror reflects the rear under field of view of the automotive vehicle and allows a driver to observe therethrough the rear under field of the view thereof and vice versa; and
   driving means for moving the mirror assembly to be positioned in the stored position or the use position, the driving means having a rotatable rod connected to an output shaft of an electric motor and rotatably supported on the deflector, a first arm fixed at one end to the rotatable rod and pivoted at the other end to one of the side surfaces of the mirror assembly, and a follower arm rotatably supported at one end of the deflector and pivoted at the other end to one of the side surfaces of the mirror assembly, said follower arm being parallel to the first arm, the follower arm being supported on the deflector adjacent where the first arm is fixed to the rotatable rod.

2. The retractable rear under view mirror device according to claim 1, wherein the driving means has a second arm fixed at one end to the rotatable rod and pivoted at the other end to an opposed side surface of the mirror assembly.

3. The retractable rear under view mirror device according to claim 2, wherein the deflector has a bracket for mounting the motor thereon and rotatably supporting the rotatable rod at both ends thereof, the bracket also rotatably supporting one end of the follower arm.

4. The retractable rear under view mirror device according to claim 1, wherein the follower arm has a pin with an elastic ring for securing the follower arm to the mirror assembly, the elastic ring being abutted on the first arm when the mirror assembly takes the use position.

5. A retractable rear under view mirror device for a vehicle mounted rearward of an automotive vehicle, comprising:
   a deflector mounted on a rear portion of the vehicle, the deflector having a bracket;
   a mirror assembly movably supported by the deflector for selectively taking a stored position housed in a recess formed on the deflector and a use position protruding from the deflector, said mirror assembly having a pair of side surfaces and said recess being defined by a pair of side surfaces;
   a first arm disposed between one of the side surfaces of the mirror assembly and one of the side surfaces defining the recess for moving the mirror assembly to the stored position from the use position;
   a second arm disposed between the other side surface of the mirror assembly and the other side surface defining the recess for moving the mirror assembly to the stored position from the use position;
   driving means connected to a power source for swinging the first arm and the second arm to follow a constant locus therefor, the driving means being accommodated by a case;
   a first stopper for retraining movement of the mirror assembly by cooperating with the first arm and keeping the use position thereof, the first stopper extending from the case; and
   a second stopper for holding the mirror assembly by co-operating with the second arm, said second stopper being fixed on the bracket.

6. A retractable rear under view mirror device for a vehicle according to claim 5, wherein a clearance is provided between the second stopper and the second arm in a state where the movement of the mirror assembly is stopped by an abutment of the first stopper and the first arm.

7. A retractable rear under view mirror device according to claim 5, wherein the driving means has a rotatable rod rotatably supported on a frame of the deflector and connected to an electric motor which is the power source, the first arm and the second arm being fixed on the rotatable rod and rotatably supported on the mirror housing.

8. A retractable rear under view mirror device according to claim 7, wherein the mirror assembly and the deflector are further connected by a link disposed in parallel with the first arm and the link is connected to the deflector by means of the first stopper.

9. A retractable rear under view mirror device for a vehicle adapted to allow a driver to observe therethrough a rear under view of the vehicle, comprising;

a mirror assembly capable of transferring an image of the rear under view of the vehicle to the driver;

a stationary member mounted to a rear portion of the vehicle and having a space for accommodating the mirror assembly; and actuating means for driving the mirror assembly from a stored position in which the mirror assembly is housed in the space of the stationary member to a use position in which the mirror assembly is positioned to enable the driver to view the rear under area of the vehicle or from the use portion to the stored position, the actuating means including a power source mounted on the stationary member, a first swingable arm extending between a side surface of the mirror assembly and a side surface of the stationary member and coupled to the power source at one end and the mirror assembly at the other end, and a link rotatably supported on the stationary member and pivoted to the mirror assembly, the first swingable arm being coupled to the mirror assembly at a coupling point adjacent to which is positioned a rubber ring which abuts a recess of the link when the mirror assembly is in the use position to restrain further downward movement of the first swingable arm.

* * * * *